(No Model.)
W. FORMAN.
PIPE JOINT.
No. 255,427. Patented Mar. 28, 1882.
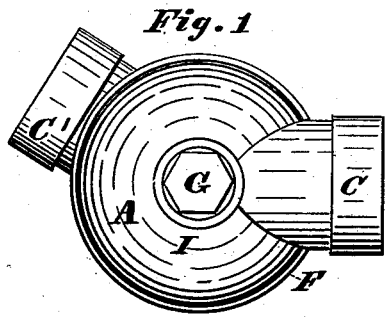
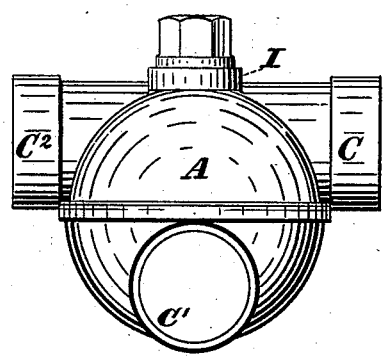
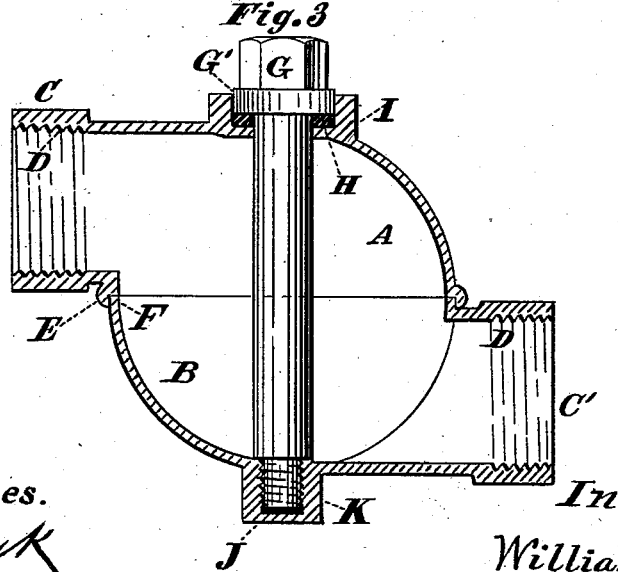
Witnesses.
Jos. Schenk
J. W. Brann
Inventor:
William Forman.
By James Sangster
Atty.

UNITED STATES PATENT OFFICE.

WILLIAM FORMAN, OF BRADFORD, PENNSYLVANIA.

PIPE-JOINT.

SPECIFICATION forming part of Letters Patent No. 255,427, dated March 28, 1882.

Application filed June 22, 1881. (No model.)

*To all whom it may concern:*

Be it known that I, WILLIAM FORMAN, a citizen of the United States, residing in Bradford, in the county of McKean and State of Pennsylvania, have invented certain new and useful Improvements in Pipe-Joints, of which the following is a specification.

My invention relates to certain improvements in joints for oil, gas, and other pipes, hereinafter more fully set forth.

Figure 1 is a top view; Fig. 2, a front elevation, showing one of the shells provided with two short tubular branch portions to receive the pipes; and Fig. 3 represents a vertical central section through the two shells, and also showing the connecting-bolt and the manner of holding them together.

A B represent the two shells, made of cast-iron or other suitable material. Each shell is provided with a branch, C C', for connecting to a pipe, and each shell and its branch constitute a section of the joint. The shell A is provided with a flanged rim, E, into which the edge F of the shell B is nicely fitted, so as to form a close steam-tight joint when the two shells are held together by the bolt G. To insure a close or steam-tight fit around the top and bottom of the bolt G, the hemisphere or shell B is provided with a downward projection, J, having a screw-thread to receive the end K of the bolt G on the inside; but it is closed on the bottom, (see Fig. 3,) so that no opening is left at that point for the escape of steam or its equivalent. The upper part of the bolt is also made steam-tight by means of a socket or depression, I, into which a washer of lead, rubber, or other similar material is fitted, and the portion G' of the head of the bolt G is made round, so that when the two shells A B are brought together with sufficient force to tighten the joint between them that portion around the head of the bolt is also tight.

The operation of my invention will be readily understood from the drawings and foregoing description. By slightly loosening the nut G the joint may be turned so as to bring the pipes which may be connected to it to any desired angle to each other, after which the nut may be tightened, and thereby hold all the parts securely together and steam-tight.

I do not claim broadly a connection consisting of two branched sections movable one upon the other and bolted together; but

I claim—

The combination, with the branched section A, having an annular flanged rim, E, of the branched section B, fitting within said rim, and the screw-bolt G, having an enlargement fitting a socket in a lug on the section A and bearing on a packing, H, in said socket, as set forth.

WILLIAM FORMAN.

Witnesses:
  W. N. HENRY,
  O. H. DEMING.